May 19, 1964

B. F. GRIB 3,134,035

TUNING FORK RESONATOR WITH DRIVING AND FEEDBACK COILS DECOUPLING

Filed Oct. 22, 1957

2 Sheets-Sheet 1

INVENTOR.
BORIS F. GRIB
BY Darby & Darby
ATTORNEYS

INVENTOR.
BORIS F. GRIB
BY Darby & Darby
ATTORNEYS 3,134,035

TUNING FORK RESONATOR WITH DRIVING AND FEEDBACK COILS DECOUPLING

Boris F. Grib, Huntington Station, N.Y., assignor to Philamon Laboratories, Inc., Long Island City, N.Y., a corporation of New York Filed Oct. 22, 1957, Ser. No. 691,615
8 Claims. (Cl. 310—25)

The present invention relates to improvements in tuning fork or vibrator resonators, such as are useful in electrical apparatus to give an alternating current output which is particularly stable and free from unwanted frequencies. More particularly the invention relates to such resonators which are particularly free from external influences of a mechanical, electrical or magnetic nature and thus have a high resistance to shock, vibration, stray electric or magnetic fields, or the like.

Tuning fork resonators are often used as resonant elements for very stable oscillators. Utilizing known practices in this field it is possible to construct oscillators having a frequency stability on the order of 10 parts per million over extensive temperature ranges. However, in addition to temperature changes there are other external influences which adversely affect the frequency stability and performance of such oscillators. Among these other external influences are shock, vibration, and stray magnetic and electric fields. The present invention provides means for reducing the effect of externally induced tuning fork vibration on the electrical output of the resonator. Means are also provided for substantially eliminating the effect of magnetic or electric fields upon the electrical output of the resonator.

It is accordingly an object of the present invention to provide a tuning fork resonator wherein the effects of vibration of the base on which the resonator is mounted are minimized.

It is another object of the present invention to provide a tuning fork mount wherein vibration externally imparted to the mount is absorbed by sliding friction, thereby rapidly damping any vibration which may be imparted to the tuning fork mount.

It is still another object of the present invention to provide a tuning fork resonator wherein the pickup coils for sensing tuning fork vibration are arranged to cancel the vibration of the tuning fork as a whole, that is, vibration in reed fashion, as distinguished from the independent opposed vibration of the tuning fork tines.

It is a further object of the present invention to provide a tuning fork resonator having pickup coils arranged in balanced fashion to cancel signals produced by vibration in reed fashion wherein means are included to minimize direct magnetic coupling between the drive coils and the pickup coils.

It is a still further object of the present invention to provide a tuning fork resonator having buckling coils which have an opposite magnetic coupling effect to that of the tuning fork drive means, thereby virtually cancelling the direct magnetic coupling effect between the drive means and the pickup coils of the resonator.

It is a still further object of the present invention to provide bucking coils to eliminate magnetic coupling between the drive and pickup means in a tuning fork resonator wherein the bucking coils include means for adjusting the magnetic coupling produced by the bucking coils so that the total magnetic coupling to the pickup coils may be effectively eliminated.

Other objects and advantages will be apparent from a consideration of the following description in conjunction with the appended drawings, in which:

FIG. 1 is a side elevational view of a tuning fork resonator and housing according to the present invention;

FIG. 2 is a bottom plan view of the resonator and housing of FIG. 1, as mounted on an electrical equipment cabinet; chassis, or the like;

FIG. 3 is a vertical cross-sectional view of the tuning fork resonator taken along the line 3—3 in FIG. 1;

FIG. 4 is a vertical cross-sectional view of the tuning fork resonator taken along the line 4—4 in FIGS. 2 and 3;

Figures 1, 2, 3, 4:
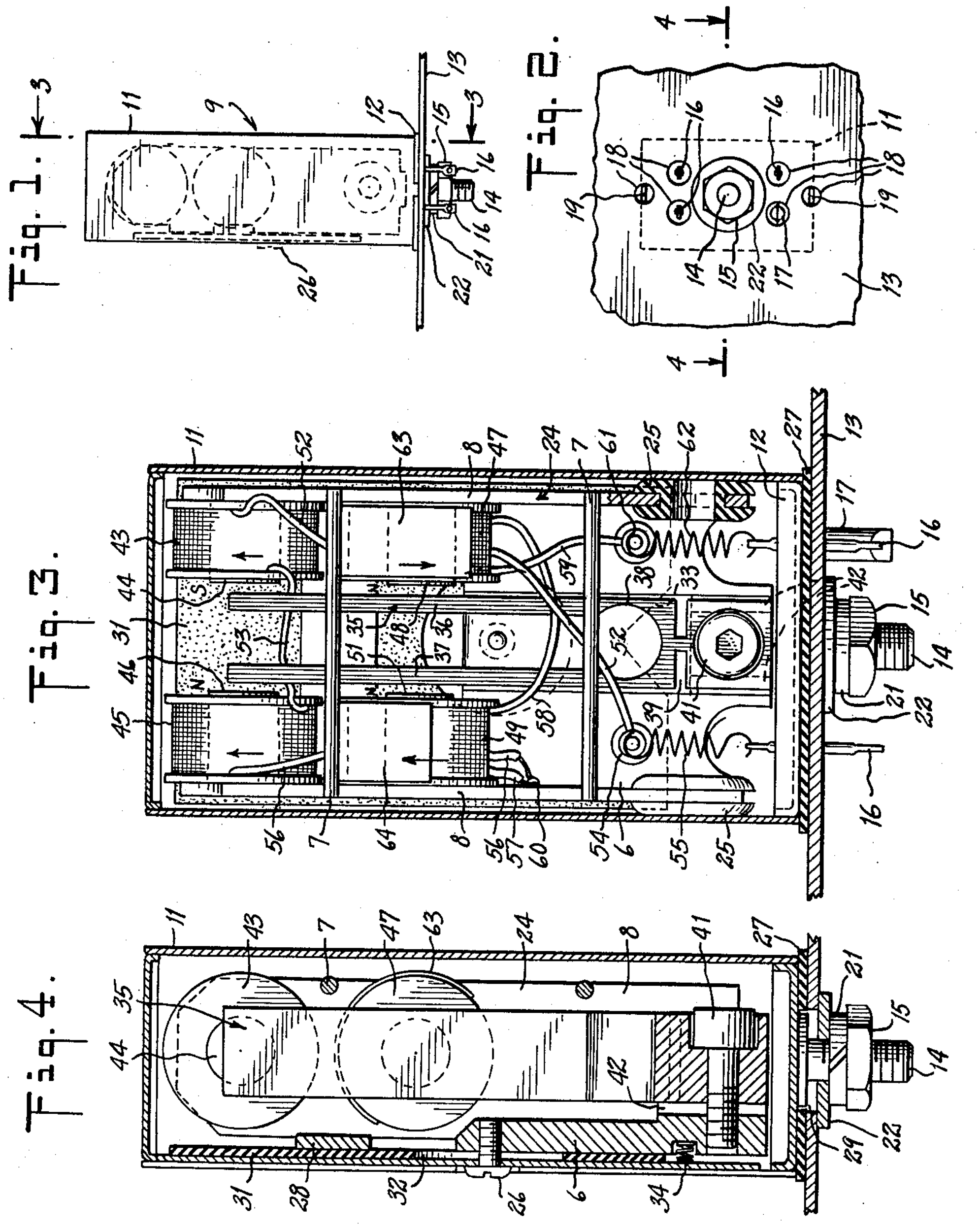

Referring now to FIGS. 1 through 4, a tuning fork resonator 9 is shown having a housing 11. The housing is provided with a base 12 which is secured to a support 13. The support 13 may be an electrical equipment chassis, a bracket, or the like. The tuning fork resonator 9 is shown positioned vertically in FIGS. 1 to 4. It may also be mounted in a horizontal or inverted or other position. The housing base 12 has a bolt or stud 14 attached thereto which passes freely through a hole in the support 13. A nut 15 is provided for the bolt 14 and a washer 21 is provided under the nut 15. A second washer 22 may also be provided under the washer 21. Insulated electrical terminals 16 extend through the housing base 12.

The housing 11 is provided with locator lugs 19 to properly align the housing on the support 13. An evacuation tubulation 17 is provided extending through the base 12 to allow the housing 11 to be evacuated if desired. After assembly of the housing 11 any openings may be sealed by soldering or otherwise, after which the interior of the housing may be evacuated by exhausting the air through the tubulation 17 and pinching it off. Evacuating the interior of the housing provides an advantage in that the damping effect of the air upon the fork tines is eliminated and frequency changes due to air temperature and density variations are also eliminated. Holes 18 are provided in the support 13 for the electrical leads 16, the locator lugs 19 and the evacuation tubulation 17.

A frame 24 is provided within the housing upon which the various resonator elements are mounted. The frame 24 has a flat base section 6 and sides 8 extending at right angles thereto. A strap 28 extends between the edges of sides 8 parallel to base 6 of the frame, and struts 7 are provided between the sides 8, at their opposite edges, all of which tend to strengthen the frame 24.

The base 6, sides 8 and cross-strap 28 of the frame may conveniently be formed from a single sheet of metal. The frame is preferably formed of magnetic material to provide a low reluctance magnetic circuit for magnetic flux from the permanent magnets and coils which are mounted on the frame.

A screw 26 fastens the frame 24 within the housing 11. The frame 24 may be supported within the housing 11 by means of rubber bumpers 25. If desired the frame 24 may be supported solely by the screw 26 eliminating the bumpers 25.

The housing 11 is mounted on chassis 13 in contact with a pad 27, which may be of rubber or other compressible material, and by means of the single bolt 14 together with nut 15 and washers 21 and 22. Washer 21 may be a lock type washer so that nut 15 will be retained set to the desired pressure, or other nut locking means may be used.

The frame 24 is mounted in the housing 11 by means of a vibration damping mounting. Between the frame 24 and the housing 11 there is placed a pad 31 having a hole 32 coaxial with the mounting screw 26 and substantially larger than the mounting screw 26 to provide freedom of movement of the frame 24. The pads 27—31 may be made of rubber, fabric, felt or any other suitable material, but preferably a material adapted to provide substantial sliding friction. A rubber-like product with the name "Silastic" may be used to advantage. A notch 33 may be cut in the pad 31 as shown in FIG. 3 so that a compression spring or springs 34 may be mounted on the frame 24 between the frame and the wall of the housing 11. The spring 34 allows the pressure of the frame 24 on the pad 31 to be adjusted to the optimum value.

The spring 34 also tends to press the outer section 28 of the frame 24 against the resilient pad 31 by pivotal section about screw 26. It will be noted that the outer section of the frame 24 is more inclined to vibrate and also that vibration of this portion of the frame 24 is likely to be more detrimental to the tuning fork resonator. If desired the spring 34 may be omitted and the force with which the frame 24 bears against the resilient pad 31 may be controlled only by adjusting the screw 26 to compress the resilient pad 31 to the necessary extent to provide the desired force. Alternatively, a bowed leaf spring, apertured to fit loosely about screw 26, may be inserted between pad 31 and frame outer section 28.

Although the pad 31 in FIG. 4 is formed in the shape of a rectangular sheet having a hole in the center thereof, the pad may also be formed in other shapes. Substantially the same result may be achieved by the use of three feet or small pads of rubber or other suitable frictional material placed between the frame base 6 and the housing 11 in the position occupied by the pad 31 shown in FIGS. 3 and 4.

The frame 24 and the housing 11 separated by the pad 31 are allowed sufficient freedom of relative movement so that any vibration of the frame 24 (such as caused by shock or high accelerations) is rapidly damped due to the absorption of energy in the sliding movement of frame 24 against pad 31. The pad 31 is preferably secured in the housing 11 for example by gluing, in order to facilitate the assembly of the resonator. Sliding movement therefore takes place between the frame 24 and the pad 31. It will be obvious however that the pad could be fastened to the frame 24 rather than the housing 11 or in some applications need not be fastened to either one.

The mounting of the resonator shown in FIGS. 1 through 4 is exceptionally effective. The use of rubber or other resilient material in anti-vibration mountings is of course well known. However, the tuning fork mounting shown operates in a different fashion from the commonly encountered rubber shock mounting. The commonly encountered rubber shock mounting is arranged to have a high degree of resilience due to compression of the rubber mounting. The only energy absorption which takes place in the usual rubber shock mounting however, is the internal absorption of energy in the rubber itself. In the present instance a high degree of resilience in the mounting is not the primary consideration. A sudden shock to the tuning fork resonator is not as detrimental as a milder but sustained vibration. It is therefore not so much desirable that sudden shock be cushioned as it is that any vibration caused thereby be rapidly absorbed so that no sustained vibration is produced. The present mounting therefore utilizes sliding movement of the rubber pad 31 and the adjacent members to dissipate the vibratory energy of the fork resonator imparted by external shock or vibration and to rapidly damp any vibration of the fork resonator and mount so that it is substantially limited to one cycle or less. Sustained vibration of the tuning fork resonator is thus avoided, greatly improving the frequency stability of the resonator.

The tuning fork 35 (best shown in FIG. 3) has two tines 36 and 37 and has a circular opening 38 at the base of the tines so that the tines are narrow at their base and vibrate readily. The tuning fork is provided with a slot 39 for isolating external vibration in accordance with the teachings of copending U.S. patent application No. 415,318 of Boris F. Grib, filed March 10, 1954, and issued as U.S. Patent No. 2,806,400 on September 17, 1957. It will be understood of course that other types of tuning forks might be employed in a resonator according to the present invention or in fact a reed or other vibratory element might be used. The tuning fork 35 may be secured to the frame 24 by means of a bolt 41. The frame 24 may be supplied with rails 42 which are ground to provide two flat edges so that the fork 35 is firmly supported to prevent wobbling or other movement which might occur if it were secured against a surface having slight irregularities.

A coil 43 is provided adjacent tine 36 of the tuning fork. In the particular embodiment shown in FIG. 3 the coil 43 is a drive coil which supplies the necessary energy to maintain the vibration of tuning fork 35. Coil 43 is wound about a permanent magnet 44. In the device shown in FIG. 3 the south pole of the permanent magnet 44 is placed adjacent the tine 36 of the tuning fork 35. The current supply to the drive coil 43 is an alternating current which produces a flux which reverses in direction during each cycle of alternating current. The magnet 44 however provides a bias flux and thus the flux generated by the coil 43 adds to or subtracts from the bias flux created by the permanent magnet 44 depending upon the momentary direction of flow of the current in the coil 43. The total flux produced at coil 43 is therefore always in the same direction but fluctuates from a maximum when the coil flux is added to the magnet flux to a minimum when the coil flux is opposing the magnet flux. A complete cycle from maximum to minimum and back again occurs for every cycle of the current supply to coil 43. A second drive coil 45 is provided adjacent tine 37 of tuning fork 35. The coil 45 is wound about a permanent magnet core 46 in a manner similar to that previously described.

As is well known the tines of a tuning fork normally vibrate symmetrically with respect to the tuning fork axis, that is, both tines of the tuning fork are moving away from the tuning fork axis during one-half of the vibration cycle and conversely both are moving toward the tuning fork axis during the other half of the cycle. Therefore, in order for the coils 43 and 45 to operate to drive the tines in coordination they must exert the maximum outward force or attraction for the tines at the same time. This means that each coil with its magnet core must produce the maximum magnetic flux at the same time as the other does. However, so far as the tines are concerned, the polarity of the drive coil flux does not matter. Hence there are two ways in which the drive coils with their magnet cores may be mounted, i.e., symmetrically or non-symmetrically with respect to the fork axis. In the present case, for a particular purpose described below, the drive coils 43, 45 are mounted symmetrically, but are wound asymmetrically with reference to the fork axis, i.e., they are wound in the same sense to produce magneto-motive forces extending in the same direction at each instant. Since the coils 43 and 45 are wound asymmetrically, the polarities of the magnets 43 and 46 must likewise be asymmetrical to provide coordinated driving of the tines 36 and 37. It will be noted that this asymmetrical magnet polarity is provided by locating the north pole of magnet 46 facing inward and adjacent tine 37 of the tuning fork 35, while the south pole of magnet 44 faces its adjacent tine 36. In this way, both coils pull simultaneously on their respective tines, and in phase with one another.

A pickup coil 47 is provided adjacent tine 36 of tuning fork 35 for sensing and responding to the vibration of tine 36 of the tuning fork. Magnetic flux for the pickup coil 47 is provided by a permanent magnet 48 about which coil 47 is wound. As tine 36 of the tuning fork 35 vibrates the air gap between tine 36 and the magnet 48 is varied thus varying the reluctance of the magnetic circuit and causing a change in the flux within the coil 47. This change of flux generates an electromotive force within the coil 47 which corresponds to the vibration of tine 36 of tuning fork 35. A similar pickup coil 49 and magnet 51 is placed symmetrically adjacent tine 37 of the tuning fork.

It will be noted that the polarities of the magnets 48 and 51 are symmetrical with respect to the axis of the tuning fork, that is, each magnet is oriented with its north pole pointing inward. The induced E.M.F. in the windings of coils 47 and 49 will therefore be symmetrical as a result of normal symmetrical vibration of the tuning fork tines 36 and 37. The direction of induced current is indicated by the arrows on coils 47 and 49. The coils 47 and 49 are connected so that their respective E.M.F.'s are additive.

The pickup coils and the drive coils in FIG. 3 are respectively connected in series although they could be connected in parallel if desired. Coil 43 has one end connected by means of lead 52 to insulated drive terminal 54 on frame 24. Drive terminal 54 is connected by a flexible electrical connector 55 to lead 16. The other end of coil 43 is connected by means of lead 53 to one end of coil 45. The other end of coil 45 is connected by means of lead 56 to frame 24 at 60 which constitutes an electrical ground. Coils 43 and 45 are thus connected in series between one external terminal 16 and ground. Coils 47 and 49 are similarly connected in series between the other insulated terminal 16 in FIG. 3 and the grounded frame 24 by means of flexible connector 62, pickup terminal 61 and leads 59, 58 and 57. Pickup coils 47 and 49 are thus connected in series in such a way that the E.M.F.'s in the coils 47 and 49 are additive. The series-connected drive coils 43 and 45 and the series-connected pickup coils 47 and 49 are each connected to the resonator frame and are thus grounded at one terminal. This is done only as a matter of convenience; obviously separate external terminals could be provided for the leads 56 and 57 if desired.

From the foregoing description it will be seen that the pickup coils 47 and 49 with their magnetic cores are arranged so that symmetrical vibration of the tines 36 and 37 generates additive electromotive forces in the respective pickup coils and thus tends to produce a higher output. On the other hand vibration of the tuning fork as a unit, that is in reed fashion, with both tines moving in the same direction, creates opposing electromotive forces in the respective pickup coils 47 and 49 and thus this reed type of vibration creates no resultant signal in the balanced pickup arrangement shown in FIG. 3. While it is rare for a fork to have pure reed vibration, any deviation from pure symmetrical vibration may be considered to be and has the same effect as a reed vibration superposed on a symmetrical vibration, and the balanced arrangement described suppresses the effects of the reed vibration component. This balanced pickup arrangement is particularly desirable when a tuning fork having an isolation section 39 is used since this section tends to allow substantial reed type vibration. At the same time the isolation section 39 tends to reduce the effect of external shock and vibration upon the normal symmetrical mode of vibration of the tuning fork. Thus when the vibration in the reed mode is eliminated by the balanced pickup coil arrangement an exceptionally stable and well isolated resonator arrangement is provided.

Previous pickup arrangements for tuning forks or the like have been subject to a great deal of direct magnetic coupling between the pickup coils and the drive coils. Direct magnetic coupling between the input and output of the resonator is highly undesirable. This magnetic coupling causes the resonator to act as if it were shunted by a transformer which passes a wide range of frequencies. Considering the resonator element as a filter, it will be observed that although it is intended that the resonator convey signals from its input to its output with a high degree of selectivity, the magnetic coupling allows signals of all frequencies to pass through with substantial amplitude. The degree of frequency selectivity of the resonator is therefore greatly degraded due to the fact that all frequencies are passed to a substantial extent by the transformer or coupling effect between input and output coils. Magnetic coupling naturally results when pickup coils and drive coils are placed in close proximity unless a great deal of magnetic shielding is employed. It is obviously undesirable to separate the pickup and drive coils since this would require the resonator device to be much larger, and it is similarly undesirable to provide excessive magnetic shielding as this would make the device heavier and of more complicated construction.

Various arrangements of coils are provided in the present invention, one of which is illustratively shown in FIG. 3 making possible the virtual elimination of direct magnetic coupling by the cancellation of voltages induced by magnetic coupling. In FIG. 3 for example, it will be noted that the currents in coils 43 and 45 are in the same sense, as indicated by the arrows on these coils. The coils 47 and 49 however are connected in the opposite sense as indicated by the arrows thereon. The electromotive force induced in coil 47 due to the inductive effect of the drive current in coil 43 is therefore of an opposite sense to the similar electromotive force induced in coil 49 by the drive current in coil 45. If these electromotive forces are equal they will completely cancel and thus eliminate the effect of any magnetic coupling between the drive coils 43 and 45 and the pickup coils 47 and 49.

Metal shields 63 and 64 are provided for coils 47 and 49 respectively. The shield 63 may be of semi-cylindrical shape to fit over the coils 47 and 49. The shields 63 and 64 may be moved around the periphery of their respective coils in order to vary the shielding between the respective pickup coil and the adjacent drive coil. The shields 63 and 64 therefore not only reduce the magnetic coupling to some extent but also perform a more important function in that they allow the amounts of electromagnetic coupling of the two pickup coils 47 and 49 to be individually adjusted so that the magnetic coupling for the two coils are equal and thus the total magnetic coupling effect is completely cancelled. Although the semi-cylindrical magnetic shields 63 and 64 provide a particularly simple and effective adjustable magnetic coupling arrangement, any other suitable means could be used for adjusting the magnetic coupling between the respective pickup coils and drive coils. For example, the coils could be made slidable to adjust the spacing between drive and pickup coils.

It will be noted in FIG. 3 that to obtain the desired relationships between the various coil windings a non-symmetrical arrangement of magnetic poles is provided for the magnets 44, 46, 48 and 51. Therefore if all the magnets were of equal strength there might be some difference in flux density in the magnetic circuits on either side of the tuning fork. This situation may readily be remedied by partially demagnetizing particular ones of the magnets (this may be accomplished simply by passing an alternating current through the coil around the particular magnet). In the particular arrangement shown in FIG. 3, for example, it has been found desirable to substantially demagnetize magnet 46 and to demagnetize magnet 48 to some extent. By this expedient it is possible to maintain substantially complete balance between the coils on the opposite sides of the tuning fork 35. Adjustment of the balance between the coils on opposite sides of the tuning fork 35 may be accomplished by pivoting the tuning fork about its mounting nut 41 so that the tines of the fork are properly spaced between the magnet poles on the two sides of the fork. Obviously diminishing the air gap at a particular coil strengthens the magnetic flux through the coil and increases its effectiveness, and conversely. By this means still further balance of the coils on opposite sides of the tuning fork 35 may be obtained.

As has been previously explained the total magnetic coupling between drive and pickup coils can be eliminated by properly adjusting the shields 63 and 64 to balance the magnetic coupling effects in coils 47 and 49.

The particular arrangement of windings and magnetic polarity shown in FIG. 3 is not the only arrangement which may be utilized to produce the desired balancing effect. Any arrangement will be satisfactory where the poles of the drive or pickup coils are symmetrically arranged with respect to the tuning fork axis while the poles of the other pair of magnets are asymmetrically arranged, and in which either the pickup or drive coils are wound in the same sense while the other pair of coils are wound in the opposite sense. Any such arrangement will result in the magnetic coupling to the respective pickup coils being in opposition so that proper adjustment of the coupling will allow the magnetic coupling to be virtually eliminated.

Figure 5:
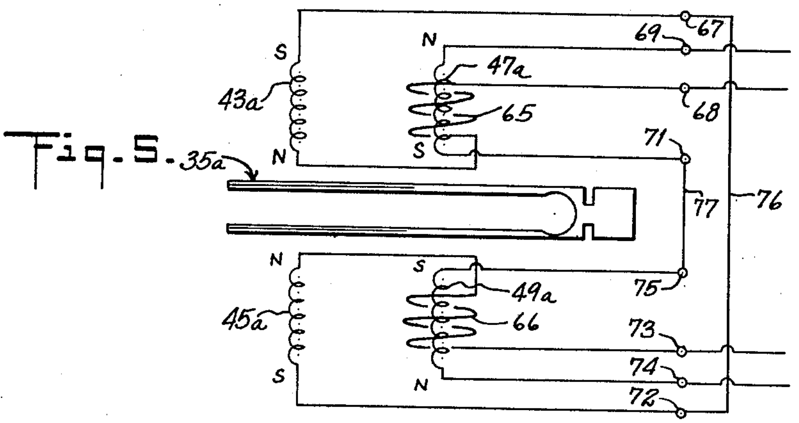
FIG. 5 is a schematic circuit diagram of an alternative circuit arrangement of the device of FIGS. 1 through 4.

FIG. 5 shows an alternative electrical circuit providing balanced pickup with substantially no total magnetic coupling. In the device of FIG. 5, the coils 43*a*, 45*a*, 47*a* and 49*a* are all arranged and wound symmetrically with respect to the tuning fork axis. The poles of the magnets are likewise symmetrically arranged. Separate bucking coils 65 and 66 are provided to counteract the magnetic coupling between the drive coils and pickup coils. In FIG. 5 coils 47*a* and 49*a* may be used as the drive coils while coils 43*a* and 45*a* may be the pickup coils.

The bucking coil 65 is wound coaxially with the drive coil 47*a* and is electrically connected in series with the pickup coil 43*a*. The bucking coil 65 has a lesser number of turns than the pickup coil 43*a*. Bucking coil 65 might for example have a number of turns equal to 5% of that of coil 43*a*. The precise number of turns of coil 65 is determined to provide a magnetic coupling effect between coils 65 and 47*a* which is equal and opposite to the coupling effect between coils 43*a* and 47*a*. With the coil 65 and the coil 43*a* connected in series the electromotive forces generated by magnetic coupling are placed in opposition so that the total magnetic effect from the drive coil 47*a* in the pickup circuit is virtually zero. This pickup and bucking coil circuit is connected to terminals 67 and 68.

A similarly wound bucking coil 66 on coil 49*a* is also connected in similar fashion on the other side of the tuning fork 35*a* and this other pickup and bucking coil circuit is connected to terminals 72 and 73. The pickup circuits on respective sides of the tuning fork may be connected in series by means of lead 76. Obviously the pickup circuits could also be connected in parallel if desired or in fact if one were willing to forego the balanced effect of the two pickup coils, the circuit on only one side of the tuning fork could be used thus permitting omission of coils 45*a*, 49*a* and 66, for example.

The drive coil 47*a* is connected to terminals 69 and 71 and the drive coil 49*a* is connected to terminals 75 and 74. The drive coils 47*a* and 49*a* may be connected in series by a lead 77, or could of course be connected in parallel if desired.

The circuit of FIG. 5 has the advantage of simplicity and perfect balance. However it will be noted that where separate bucking coils are wound coaxially around the drive coils it is difficult to achieve a complete cancellation of magnetic coupling by adjusting the number of turns of the bucking coil. It is therefore desirable to provide a bucking coil arrangement wherein the magnetic coupling to the bucking coil is more readily adjustable.

Figure 6:
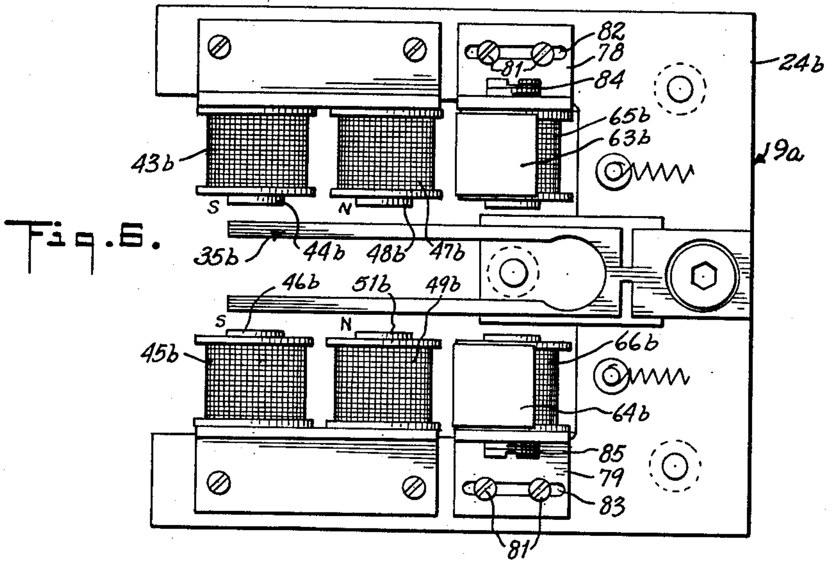
FIG. 6 is a top plan view of an alternative type of tuning fork resonator according to the present invention.

FIG. 6 shows an alternative arrangement which provides the advantage of easy adjustment of the magnetic coupling between the drive coil and the bucking coil. The construction of the resonator shown in FIG. 6 is generally similar to the device of FIG. 3. It will be noted however, that the resonator 9*a* in FIG. 6 is provided with three coils on either side of the tuning fork. The coils are mounted on a support 24*b*. Coils 43*b*, 45*b*, 47*b* and 49*b* are mounted in positions corresponding to coils 43, 45, 47 and 49 respectively in FIG. 3.

Coils 43*b* and 45*b* may be utilized for pickup coils in the resonator 9*a*. Coils 47*b* and 49*b* may be utilized as the drive coils. The magnetic poles of the magnets 45*b*, 46*b*, 48*b* and 51*b* may be arranged symmetrically since the magnetic coupling cancellation in the resonator 9*a* is provided by separate coils and not by asymmetrical arrangement of the magnetic poles. The tuning fork 35*b* may be similar to the tuning fork 35 in FIG. 3.

Magnetic coupling cancellation in the resonator 9*a* is provided by separate bucking coils 65*b* and 66*b*. The bucking coils 65*b* and 66*b* are preferably placed toward the shank of the tuning fork 35*b* so that the tuning fork vibration in the vicinity of the bucking coils is relatively negligible.

It will be noted that the bucking coils 65*b* and 66*b* are placed respectively adjacent the drive coils 47*b* and 49*b* so that the magnetic coupling between the drive coils 47*b*, 49*b* and the bucking coils 65*b*, 66*b* is of substantially the same magnitude as the magnetic coupling between the drive coils 47*b*, 49*b* and the pickup coils 43*b*, 45*b*.

Figure 7:
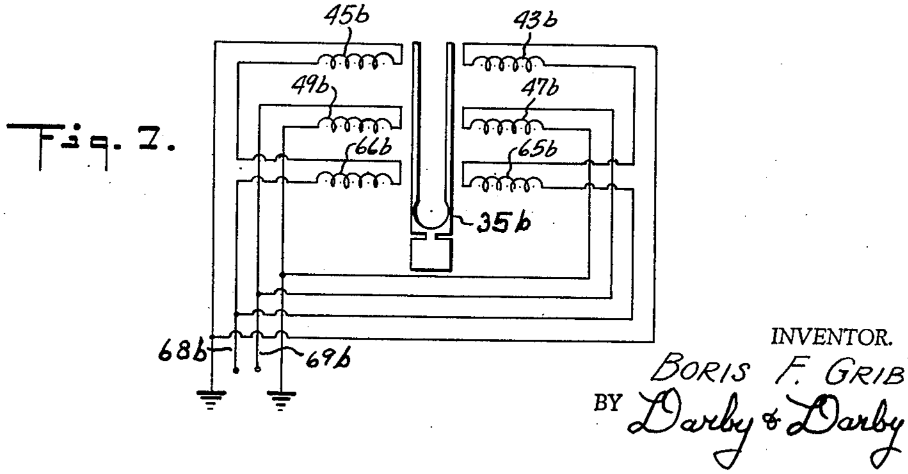
FIG. 7 is a schematic circuit diagram of the tuning fork resonator of FIG. 6.

The electrical connections to the coils in FIG. 6 have been omitted for simplicity. However, the bucking coils 65*b* and 66*b* perform the same function as the coils 65 and 66 in FIG. 5 and may be electrically connected in the manner shown in FIG. 7. The electrical connection of the bucking coils should be such that the magnetic coupling to the bucking coils is in opposition to the magnetic coupling to the pickup coils.

The arrangement of FIG. 6 provides an advantage over that schematically shown in FIG. 5 in that the magnetic coupling to the bucking coils 65*b* and 66*b* is adjustable. The coil 65*b* is mounted to a bracket 78 which is in turn mounted to the support 24*b* by means of screws 81 passing through a slot 82 in the bracket 78. A similar bracket 79 with a slot 83 is provided for bucking coils 66*b*. The mounting of the coils 65*b* and 66*b* allows the distance between coil 65*b* and coil 47*b*, for example, to be adjusted by moving the bracket 78. After the proper adjustment is attained the bracket may be fixed in position by tightening the screws 81.

If desired, further adjustment of the magnetic coupling may be provided by adjustable shields 63*b* and 64*b* corresponding to the shields 63 and 64 of FIG. 3. Still further adjustment of the magnetic coupling may be provided by adjustment of threaded cores 84 and 85 threadedly inserted in brackets 78 and 79 respectively. The cores 84 and 85 may be of soft iron since no permanent magnet is required by the bucking coils 65*b* and 66*b*. The degree to which the cores 84 and 85 are inserted into the coils 65*b* and 66*b* will determine the reluctance of the magnetic circuit through the coils and thus will control the magnetic coupling to the bucking coils 65*b* and 66*b*.

It should be understood that three methods of adjusting the magnetic coupling are shown by way of illustration in FIG. 6, but that any single one or combination of the adjustments could be utilized, or any other method of adjusting the magnetic coupling could be used. The magnetic coupling to the cores 65*b* and 66*b* should be adjusted to exactly counteract the coupling to the pickup coils 43*b* and 45*b* respectively and thus substantially eliminate any total magnetic coupling effect between the input and output of the resonator.

The bucking coils 65*b* and 66*b* being connected in opposition to the pickup coils 43*b* and 45*b* will not materially detract from the sensitivity of the pickup arrangement since the amplitude of the tuning fork vibration at the shank of the fork where bucking coils 65*b* and 66*b* are located is negligible compared to the amplitude at the outer ends where pickup coils 43*b* and 45*b* are located.

Once the magnetic coupling in either the resonator 9 or the resonator 9*a* shown in FIGS. 3 and 6 respectively has been adjusted to substantially achieve cancellation of total magnetic coupling, no further adjustment is necessary. Accidental dislocation of the various coupling adjustments may be prevented by the application of an insulative and protective coating over the coils and brackets and the wire leads. For example, the coils may be coated with varnish or the like and baked to dry and harden the varnish to protect the coils and also to secure the coupling adjustments against accidental displacement.

A frequent application of resonators according to the present invention is found in very stable oscillators where they are combined with an amplifier and feedback circuit to provide a source of alternating current having a very high frequency-stability and accuracy. The improvement in the decoupling between input and output in the present invention provides a device of increased utility which may be used, for example, as a very high-Q electrical filter. It will be appreciated that a tuning fork inherently has a very high Q, that is, it reacts to input frequencies of a very limited range in proportion to its resonant frequency. A device according to the present invention may therefore be used as a filter which will transmit electrical signals of a particular frequency with very little attenuation but which will not transmit to any appreciable extent electrical signals of other frequencies. Previous tuning fork resonators were not suitable for such applications due to the direct coupling between the input and output due to the magnetic or other effects. The present invention reduces such direct coupling to a negligible value.

From the foregoing description and explanation it may be observed that a tuning fork resonator is provided in which external influences upon the resonator output are greatly diminished and thus a resonator is provided capable of producing a signal of a very high degree of purity and stability.

Numerous modifications have been suggested to the various embodiments of the invention shown herein. It will be appreciated that many other modifications could be devised by a person of ordinary skill in the art without exceeding the scope of the present invention. The scope of the present invention is therefore not to be considered to be limited to the embodiments shown, but is rather to be limited solely by the appended claims.

What is claimed is:

1. Electro-mechanical resonator apparatus comprising a vibrator, means for generating a fluctuating magnetic field for driving said vibrator, means for causing a second fluctuating magnetic field to be generated in response to vibrations of said vibrator, means located in said second field for converting magnetic field fluctuations into an electrical signal, and compensating means for producing an electrical signal substantially equal and opposite to the signal produced by the said converting means due to the direct influence of said first fluctuating magnetic field, said means for causing a second fluctuating magnetic field to be generated in response to vibrations of said vibrator comprising at least one permanent magnet adjacent said vibrator to create a field in a gap between said magnet and said vibrator, which field is substantially parallel to the plane of vibration of said vibrator, and said means for converting magnetic field fluctuations into an electrical signal comprising a coil encircling said permanent magnet.

2. Apparatus as claimed in claim 1, wherein said means for generating a fluctuating magnetic field for driving said vibrator comprises at least one coil adjacent said vibrator and a permanent magnet for supplying a constant bias flux in said coil.

3. Electro-mechanical resonator apparatus comprising a vibrator, input terminals adapted to be connected to a driving signal source, a first pair of coils connected to said input terminals and located adjacent said vibrator, a second pair of coils located adjacent said vibrator, a source of magnetic flux for said second pair of coils, direction of said flux being substantially parallel to the plane of vibration of said vibrator, output terminals, and means for connecting said output terminals to said second pair of coils so that the signal supplied to said output terminals by the first coil of said second pair of coils due to inductive coupling from said first pair of coils is opposite in sense to that supplied to the output terminals by the second coil of said second pair of coils, whereby inductive coupling between said input terminals and output terminals is substantially eliminated.

4. Electro-mechanical resonator apparatus as claimed in claim 3 further including means for adjusting the magnetic coupling to at least one coil of said second pair of coils from the magnetic fields of said first pair of coils.

5. Electro-mechanical resonator apparatus as claimed in claim 3 further including means for supplying a constant bias magnetic flux to at least one coil of said first pair of coils.

6. Electro-mechanical resonator apparatus comprising a tuning fork, input terminals adapted to be connected to a driving signal source, a first pair of coils connected to said input terminals and located externally adjacent respective tines of said tuning fork, means for supplying a constant bias magnetic flux to each of said first pair of coils, a second pair of coils located externally adjacent respective tines of said tuning fork, means for supplying a magnetic flux to each of said second pair of coils, said flux having a direction in a gap between each said coil and a tine of said fork substantially parallel to the plane of vibration of said fork, the magnetic flux supplied to one pair of coils being in the same direction in both coils and the magnetic flux supplied to the other pair of coils being in opposite directions in the respective coils of the pair, output terminals and means for connecting said output terminals to said second pair of coils so that the signal supplied to said output terminals by the first coil of said second pair of coils due to inductive coupling from said first pair of coils is opposite in sense to that supplied by the second coil of said second pair of coils, whereby inductive coupling between said input terminals and said output terminals is substantially eliminated.

7. Electro-mechanical resonator apparatus as claimed in claim 6 further including means for adjusting the magnetic coupling to at least one coil of said second pair of coils from the magnetic fields of said first pair of coils.

8. Electro-mechanical resonator apparatus comprising a tuning fork, input terminals adapted to be connected to a driving signal source, a first pair of coils connected in series between said input terminals and located externally adjacent respective tines of said tuning fork, means for supplying a constant bias magnetic flux to each of said first pair of coils, a second pair of coils located externally adjacent respective tines of said tuning fork, means for supplying a magnetic flux to each of said second pair of coils, said flux having a direction in a gap between each said coil and a tine of said fork substantially parallel to the plane of vibration of said fork, the magnetic flux supplied to one pair of coils being in the same direction in both coils and the magnetic flux supplied to the other pair of coils being in opposite directions in the respective coils of the pair, output terminals and means for connecting said second pair of coils in series between said output terminals so that the signal supplied to said output terminals by the first coil of said second pair of coils due to inductive coupling from said first pair of coils is opposite in sense to that supplied by the second coil of said second pair of coils, whereby inductive coupling between said input terminals and said output terminals is substantially eliminated.

References Cited in the file of this patent

UNITED STATES PATENTS

| | | |
|---|---|---|
| 1,909,414 | Matte | May 16, 1933 |
| 2,015,410 | Prescott | Sept. 24, 1935 |
| 2,241,138 | Julien | May 6, 1941 |
| 2,638,303 | Pietz | May 12, 1953 |
| 2,817,779 | Barnaby | Dec. 24, 1957 |
| 2,971,104 | Holt | Feb. 7, 1961 |